United States Patent
Borchard et al.

(10) Patent No.: US 8,422,005 B2
(45) Date of Patent: Apr. 16, 2013

(54) METHOD AND APPARATUS FOR MULTIPLE FIELD-ANGLE OPTICAL ALIGNMENT TESTING

(75) Inventors: Joseph F. Borchard, McKinney, TX (US); William H. Wellman, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 183 days.

(21) Appl. No.: 12/836,051

(22) Filed: Jul. 14, 2010

(65) Prior Publication Data

US 2012/0013895 A1 Jan. 19, 2012

(51) Int. Cl.
 *G01B 9/00* (2006.01)
(52) U.S. Cl.
 USPC .......................................... 356/127; 356/124
(58) Field of Classification Search ................... 356/138, 356/124, 127; 359/362
See application file for complete search history.

(56) References Cited

U.S. PATENT DOCUMENTS

| 3,367,607 | A | * | 2/1968 | Bowen, Jr. ................ 244/3.16 |
| 5,574,555 | A | * | 11/1996 | Yamaguchi et al. .......... 356/125 |
| 6,430,367 | B1 | * | 8/2002 | Koike et al. ..................... 396/6 |
| 2005/0212951 | A1 | * | 9/2005 | Miyata et al. ................ 348/345 |
| 2007/0247639 | A1 | | 10/2007 | Amstel et al. |
| 2009/0129412 | A1 | | 5/2009 | Kim |

OTHER PUBLICATIONS

European Search Report dated Jul. 18, 2011 of European Application No. 11164447.2 (5 pages).
European Response to Notification & Communication filed Jul. 7, 2012 for European Patent Appl. No. 11164447.2, 8 pages.

* cited by examiner

*Primary Examiner* — Roy M Punnoose
(74) *Attorney, Agent, or Firm* — Daly, Crowley, Mofford & Durkee, LLP

(57) ABSTRACT

Various embodiments provide an optical alignment apparatus that includes a mirror structure having a plurality of mirrors, the mirror structure being configured for mounting a lens. The plurality of mirrors are arranged so as to redirect a collimated beam of radiation into the lens at different angles so as to measure one or more alignment parameter of the lens.

19 Claims, 5 Drawing Sheets

METHOD AND APPARATUS FOR MULTIPLE FIELD-ANGLE OPTICAL ALIGNMENT TESTING

BACKGROUND

This disclosure pertains to optical alignment in general, and in particular to a method and apparatus for multiple field-angle optical alignment testing.

Optical alignment involves adjustment of boresight, focus, or rotation, or any combination of two or more thereof. Boresight (in X and Y directions) can be set by measuring the position of a beam spot in the image. Focus (in Z direction) can be set by measuring the percentage of source energy (e.g., laser) that is captured when the spot is centered on a pixel of the image. Rotation (R) can be set by measuring a location of a beam spot at extreme positions in the image plane. These measurements are often accomplished at multiple beam angles. Conventionally, in order to vary the beam angle so as to perform the measurement at multiple beam angles, a lens being tested is often tilted repetitively relative to a collimated point source. The sequential tilting and mechanical motions of the lens can limit the accuracy and speed of the above measurements. In addition, the repetitive measurements at multiple angles increases the time needed to perform the alignment and thus increases the overall cost for alignment of the lens. The term "lens" is used herein to refer to any optical system including one, two or more optical lenses. In addition, the term "lens" is further used herein to refer to any optical system inclusive of reflective or refractive optical components.

One conventional method for performing optical alignment of the lens includes mounting the lens on a two-axis gimbal for viewing a collimated radiation source. A series of mechanical motions of the lens sets the different angular positions needed for measuring at multiple field angles. For example, in order to achieve boresight and rotation alignment of the lens, measurements are performed both prior and subsequent to alignment. Due to limited accuracy of mechanical motions, repetitive measurements are sometime required before achieving desired alignment accuracy. These repetitive measurements may prevent the alignment test/measurement from being rapid and may reduce the accuracy of the alignment. Indeed, the repetitive mechanical motions can make alignment a particularly time consuming and expensive operation.

Therefore, there is a need in the art for a system and method for multiple field angle optical alignment testing that provides an efficient and rapid as well as substantially accurate alignment.

SUMMARY

One or more embodiments of the present disclosure provide an optical alignment apparatus. The optical alignment apparatus includes a mirror structure having a plurality of mirrors, the mirror structure being configured for mounting a lens. The plurality of mirrors are arranged so as to redirect a collimated beam of radiation into the lens at different angles so as to measure an alignment parameter of the lens.

Another embodiment of the present disclosure provides a method for performing optical alignment of a lens. The method includes directing a collimated beam of radiation onto the lens, the lens having mounted thereon a mirror structure having a plurality of mirrors. The mirrors are arranged so as to redirect the collimated beam of radiation into the lens at different angles. The method further includes measuring an alignment parameter of the lens.

These and other features and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of this disclosure, the structural components illustrated herein are drawn to scale. It is to be expressly understood, however, that the drawings are for the purpose of illustration and description only and are not intended as a definition of the limits of the inventive concept. As used in the specification and in the claims, the singular form of "a", "an", and "the" include plural referents unless the context clearly dictates otherwise.

DETAILED DESCRIPTION

Figure 1:
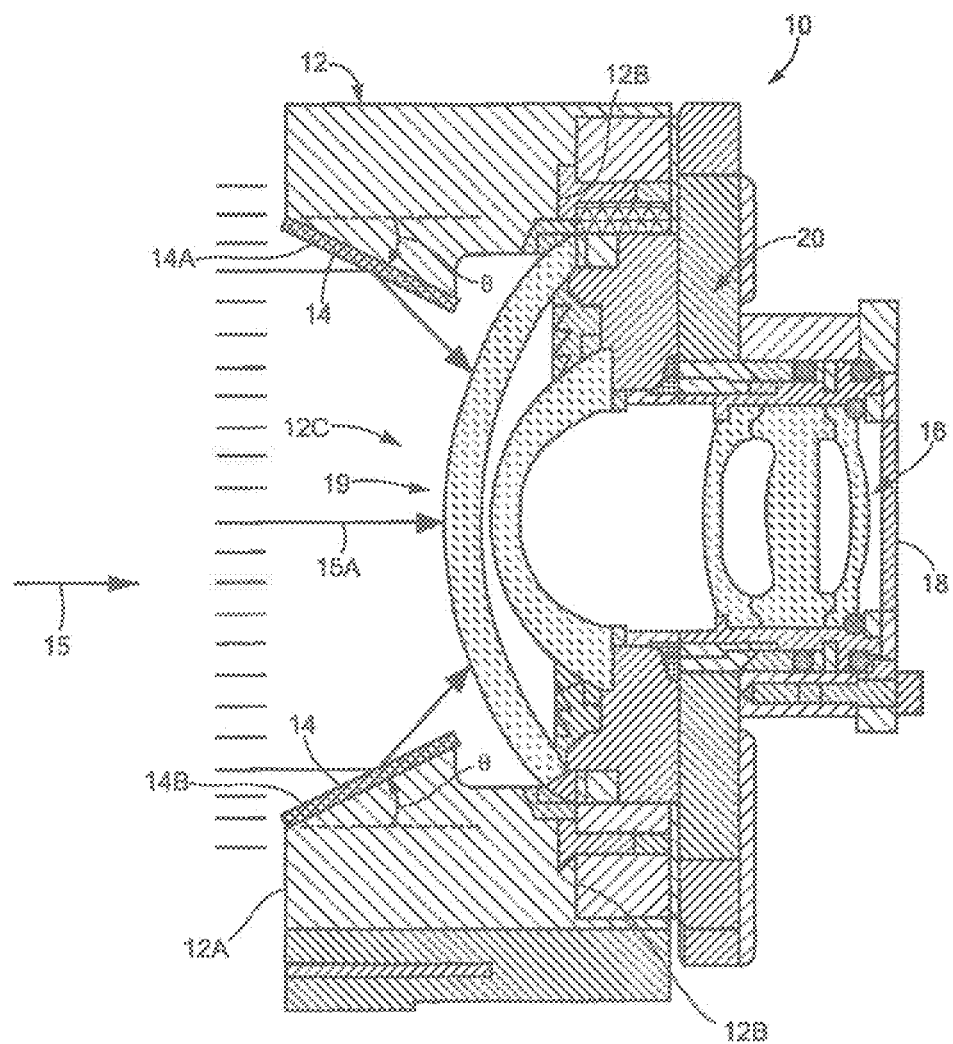
FIG. 1 is a sectional view of an alignment apparatus for performing optical alignment of an optical lens, according to one embodiment.

FIG. 1 is a sectional view of an alignment apparatus for performing optical alignment of an optical lens, according to an embodiment. Alignment apparatus 10 includes mirror block 12. Mirror block 12 comprises multiple mirror facets 14 configured to re-direct a collimated beam of radiation 15 into lens 16 at different angles. Multiple mirror facets 14 are provided on front face 12A of mirror block 12.

Figure 2A:
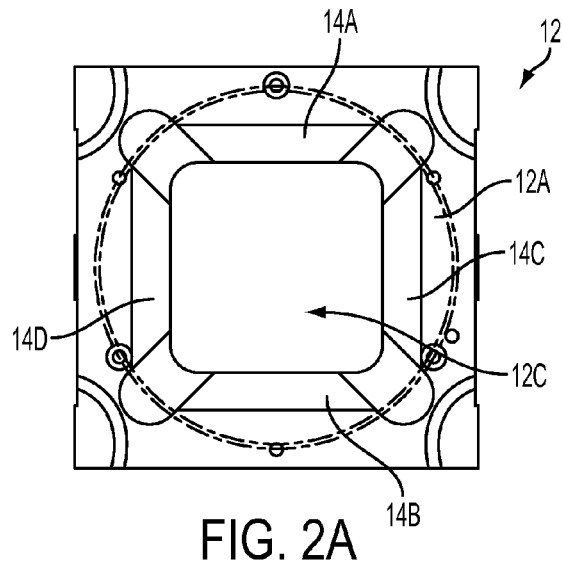
FIG. 2A is a view of front face a mirror block of the alignment apparatus shown in FIG. 1.
Figure 2B:
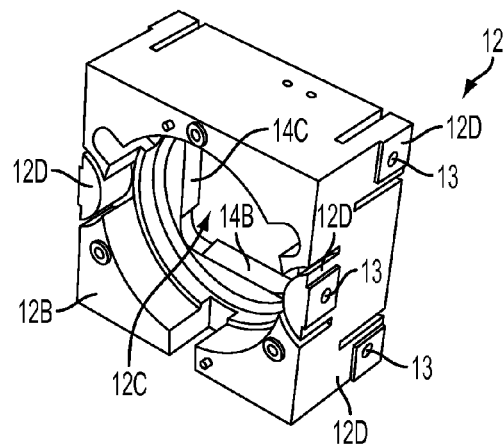
FIG. 2B is a perspective view of mirror block showing a back face of the mirror block of the alignment apparatus shown in FIG. 1.
Figure 2C:
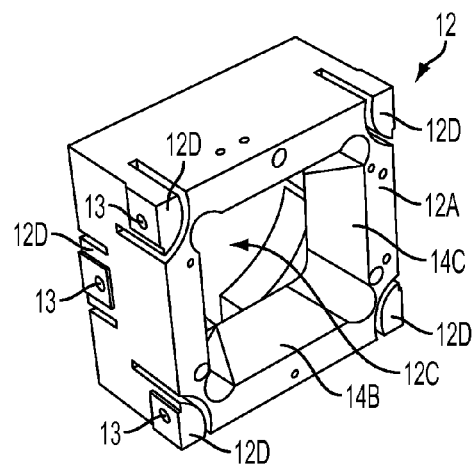
FIG. 2C is a perspective view of the mirror block showing the front face of the mirror block of the alignment apparatus shown in FIG. 1.

FIG. 2A is a view of front face 12A of mirror block 12 shown in FIG. 1. FIG. 2C is a perspective view of the mirror block 12 showing the front face 12A. In one embodiment, as shown in FIG. 2A, four mirror facets 14A, 14B, 14C and 14D are provided to redirect the collimated beam of radiation 15. Although four mirror facets 14A, 14B, 14C and 14D are depicted in FIG. 2A, two, three, five or more facets can also be provided. In one embodiment, reflecting mirror facets 14A, 14B, 14C and 14D are machined at desired angles for precision optical alignment measurements. In one embodiment, mirror block 12 is made from a monolithic metal block and the mirror facets 14A, 14B, 14C and 14D are machined from the monolithic metal block. By machining the mirror facets 14A, 14B, 14C and 14D from a monolithic block, the relative position and the angular orientation of the mirror facets can be defined with higher precision thus providing enhanced precision of alignment measurements. In another embodiment, mirror facets 14A, 14B, 14C and 14D are mounted to a body of mirror block 12. For example, the mirrors facets 14A, 14B, 14C and 14D can be fastened, attached or glued to the body of mirror block 12. In one embodiment, angular positioning can be assured by diamond-point turning of mirror surfaces 14A, 14B, 14C and 14D in a precision indexed setup. In one embodiment, mirror facets 14A, 14B, 14C and 14D are inclined at an angle θ of about 24° relative to on-axis ray 15A.

Mirror block 12 further includes back surface 12B that is configured to mount the lens 16 under test. FIG. 2B is a perspective view of mirror block 12 showing back face 12B. In one embodiment, lens 16 and detector 18 (shown in FIG. 1) are mounted as an optical assembly onto holder 20. Holder 20 is, in turn, mounted onto back face 12B of block mirror 12. When using mirror block 12, alignment measurements of lens 16 at a plurality of field angles can be accomplished simultaneously and accurately. The simultaneous measurements at plurality of angles provides a rapid and relatively precise alignment. By measuring multiple field angles simultaneously, alignment apparatus 10 provides a speedy and accurate alignment of the lens 16 and detector 18.

In one embodiment, mirror block 12 is constructed as a monolithic metal block. In one embodiment, the metal block is shaped using numerically controlled machining. Mirror facets 14A, 14B, 14C are diamond-point turned to achieve the desired optical finish and angular positioning accuracy.

As shown more particularly in FIGS. 2B and 2C, mirror block 12 includes three-point mounting tabs 13. Mounting tabs 13 are also diamond-turned for precise flatness and to provide mounting tabs surfaces that are substantially perpendicular to front face 12A of block 12. Mounting tabs 13 are provided on notched portions 12D of block 12. Notched portions 12D are configured to provide desired flexure to block 12 so that stress caused by fastening bolts or screws fastened to mounting tabs 13 does not warp the precision alignment of the reflective surfaces 14A, 14B, 14C and 14D. However, the mirror block 12 can also be mounted by other means.

FIG. 1 illustrates how mirror block 12 generates off-axis calibration points for the detector 18. Mirror facets 14A, 14B, 14C and 14D are slanted, inclined or angled so as to reflect off-axis radiation of collimated radiation beam 15 into lens 16 at desired azimuth and elevation angles. In addition, hollow center 12C in mirror block 12 provides an on-axis reference for boresighting. By providing four mirror facets 14A, 14B, 14C and 14D for reflecting off-axis radiation and a hollow center 12C for not reflecting on-axis radiation, this configuration simultaneously provides five precision points on detector 18 for alignment measurements.

TABLE 1

| Point | Azimuth | Elevation |
|-------|---------|-----------|
| A | 0° | 0° |
| B | −48° | 0° |
| C | +48° | 0° |
| D | 0° | +48° |
| E | 0° | −48° |

Table 1 summarizes 5 points obtained at detector 18 and their associated azimuth and elevation angles. In the embodiment shown in FIG. 1, mirror facets 14A, 14B, 14C and 14D are inclined at an angle θ of about 24 degrees relative to the on-axis rays 15A of the collimated radiation beam 15. Mirror facets 14A, 14B, 14C and 14D provide ray angles of ±48 degrees in azimuth or elevation, as listed in Table 1. For example, mirror facet 14A provides point E located at 0° azimuth angle and at −48° elevation angle. Mirror facet 14B, which is located opposite to mirror facet 14A, provides point D located at 0° azimuth angle and at +48° elevation angle. Mirror facet 14C provides point C located at +48° azimuth angle and at 0° elevation angle. Mirror facet 14D, which is located opposite to mirror facet 14C, provides point B located at −48° azimuth angle and at 0° elevation angle. On-axis rays 15A pass through the central opening 12C and yield on-axis point A at 0° azimuth angle and at 0° elevation angle. These five points A, B, C, D and E are generated simultaneously.

Figure 3A:
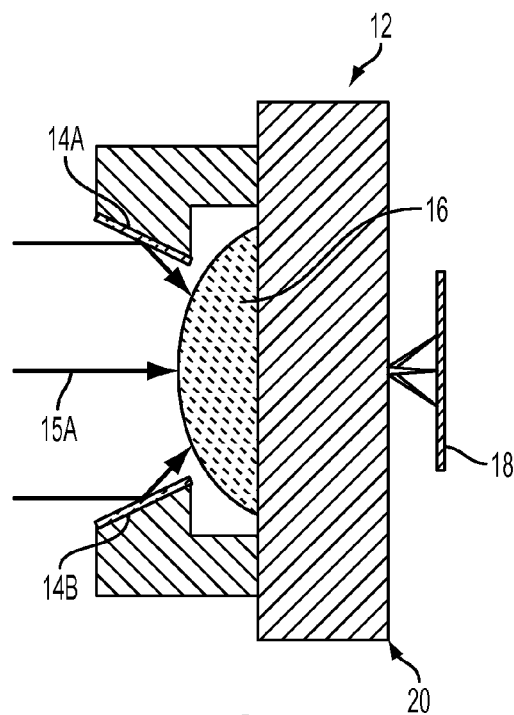
FIG. 3A depicts a configuration of an alignment apparatus for a wide-angle lens, according to one embodiment.
Figure 3B:
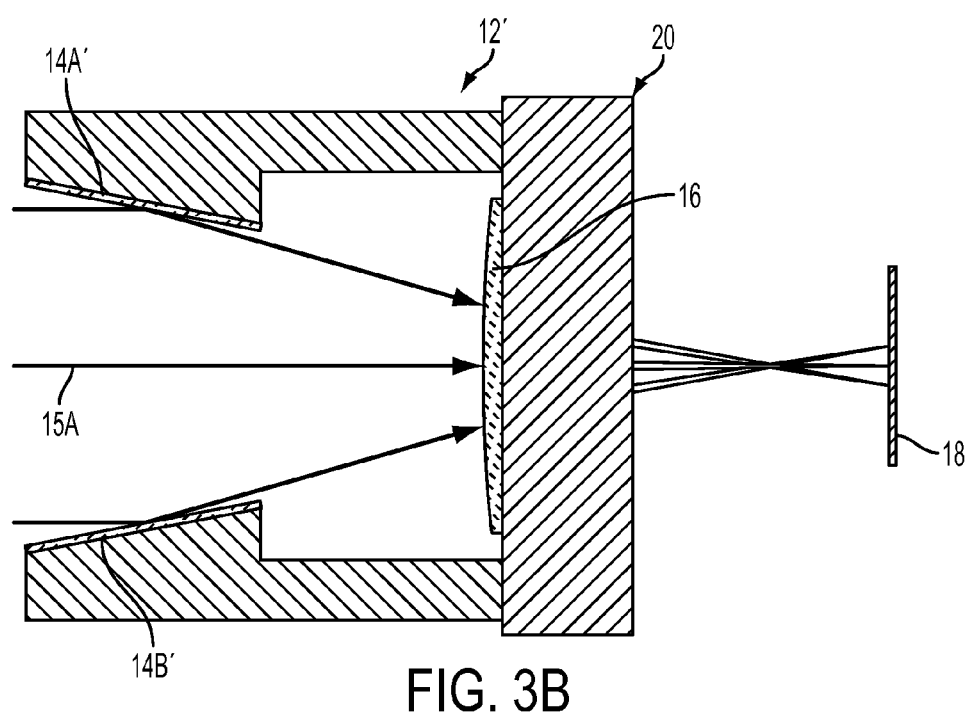
FIG. 3B depicts a configuration of an alignment apparatus for a normal or moderate telephoto lens, according to another embodiment.

As stated above, the number of mirror facets 14 can be selected as desired to measure alignment parameters. For example, additional mirror facets 14 can be provided for generating additional measurement points. Furthermore, the slanting angle of mirror facets 14 can also be changed as desired. In one embodiment, the present symmetric angles explore points near four edges of the field of view (FOV), i.e., top, bottom, left, and right. However, these angles can be varied to add points at corners of the FOV or add points nearer a center of the FOV. In addition, the points need not be symmetrically positioned. Indeed, in other embodiments, variations may be useful in evaluating angles-mapping characteristics such as linearity. For example, smaller incline angle θ can be used for testing optics (lens 16) with a less wide field-of-view (FOV). On the other hand, a larger incline angle can be used for testing optics (lens 16) with wider FOV. FIG. 3A depicts a configuration of alignment apparatus 10 where mirror facets 14 (e.g., mirror facets 14A and 14B as shown in FIG. 3A) are provided within mirror block 12 at a steeper or larger incline angle θ relative to the on-axis radiation beam 15A for alignment testing lens 16 with a wide FOV. FIG. 3B depicts a configuration of alignment apparatus 10 where mirror facets 14 (e.g., mirror facets 14A' and 14B' as shown in FIG. 3B) are provided within mirror block 12' at a smaller incline angle θ relative to the on-axis radiation beam 15A for alignment testing lens 16 with less wide FOV.

In the embodiment depicted in FIG. 1, lens 16 is a relatively wide FOV or relatively wide angle lens that has pupil wander. That is, the size and position of the reflected ray bundle in designed to fill the lens aperture as it moves about the first lens element. For the relatively wide-angle lens (i.e., wide FOV) lens 16 of this example, reflections from the mirror facets 14A, 14B, 14C and 14D fully covered the entrance pupil 19 or the lens 16. In the embodiment depicted in FIG. 1, a size of the mirror facet 14A, 14B, 14C, 14D is larger than the small pupil. In one embodiment, the position of the ray bundle reflected by the mirror facets 14A, 14B, 14C and 14D is substantially centered on the entrance pupil 19. In one embodiment, since lens 16 does not employ re-imaging, the entrance pupil position on front lens element 16A of lens 16 varies with the field angle or field of view.

For a lens 16 having an entrance pupil 19 that is relatively large or fixed in position, a mirror block configuration similar to mirror block 12 can be used to apply radiation flux over a portion of the entrance pupil 19. In this case, applying radiation flux over a portion of the entrance may result in smaller radiation beams and thus not give full-aperture image sharpness due to diffraction limits and other limited-aperture effects. Hence, focus quality cannot be measure with full precision. Nonetheless, for manufacturing purposes, focus can still be set for minimum blur at the midpoint of settings where blur increases notably, and checked by comparing measure blur spot size with the size that is predicted by lens design software for the limited aperture size. In addition, field mapping accuracy can still be measured with precision.

Using the alignment apparatus described above, boresight, focus, or rotation, or any combination of two or more thereof can be measured. Boresight (in X and Y directions) can be set by measuring the position of beam spots (A, B, C, D and E) in the image on the detector 18. Focus (in Z direction) can be set by measuring the percentage of source energy (e.g., laser) that is captured when the spot is centered on a pixel of the image. Rotation (R) can be set by measuring a location of the beam spots (B, C, D and E) at extreme positions in the image plane. The difference in vertical position between spots B and C provides an accurate measure of rotation. Similarly, the difference in horizontal position between spots D and E also provides an accurate measure of rotation. The relatively large off-axis position of these beam spots makes these measurements accurate indicators of rotation or clocking angle. However, other angles are possible. For example, corner points at larger off-axis positions may increase the accuracy of measurement. However, intermediate points closer to the center of the FOV may also provide suitable accurate measurements.

Figure 4:
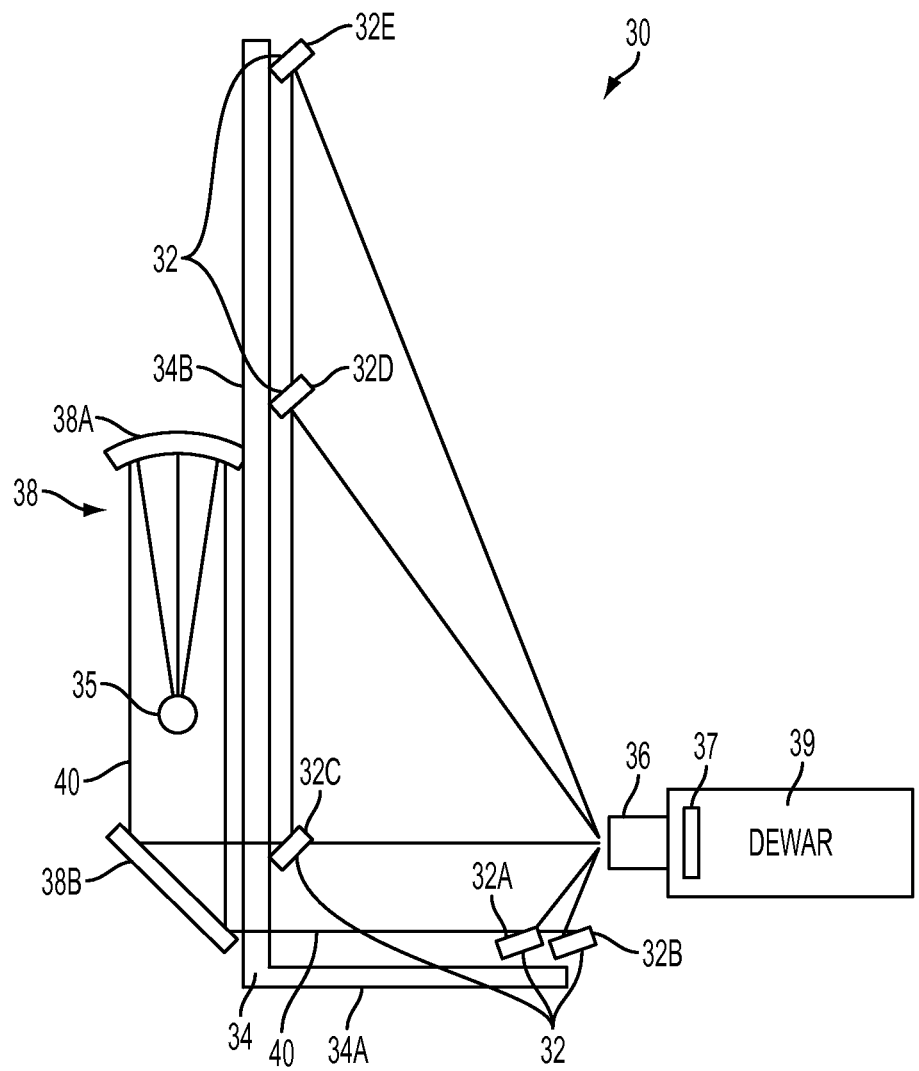
FIG. 4 is a schematic side view of an alignment apparatus, according to another embodiment.

FIG. 4 is a schematic side view of an alignment apparatus for performing optical alignment of a lens, according to another embodiment. Optical alignment apparatus 30 comprises plurality of mirrors 32. Mirrors 32 are mounted on frame 34. In this embodiment, the mirrors or reflectors 32 may or may not be precision machined. In this embodiment, there are shown four mirrors 32A, 32B, 32C, 32D and 32E. However, as it can be appreciated three or more mirrors can be used as desired to perform alignment measurements. Frame 34 is placed in front of lens 36. In one embodiment, frame 36 has a L-shape. However, the frame can have other shapes such as, but not limited to, a T-shape or other angled-shape. Mirror 32A and 32B are positioned on the horizontal portion 34A of frame 34. Mirrors 32C, 32D and 32E are positioned on the vertical portion 34B of frame 34, which can be extended to support the sensor being tested (i.e., lens 36, detector 37, and dewar 39). In one embodiment, mirrors 32 can be mounted to frame 34 via posts, brackets or the like.

In one embodiment, a radiation source 35 and optical assembly 38 is used to generate a collimated radiation beam 40. In one embodiment, radiation source 35 can be a lamp or heat source disposed behind a "pinhole" aperture, as is commonly done in collimator construction. In one embodiment, optical assembly 38 includes collimating mirror 38A for collimating radiation generated by the radiation source 35 and folding mirror 38B for directing collimated radiation beam 40 onto mirrors 32A and 32C. Mirrors 32A, 32B, 32C, 32D and 32E are selected and positioned on frame 34 such that the collimated radiation impinges upon mirrors 32A and 32C. Mirrors 32A, 32C and 32D are semi-transparent while mirrors 32B and 32E are totally reflective. A portion of collimated radiation 40 received by mirror 32A is transmitted towards mirror 32B while the other portion is reflected towards lens 36. The radiation incident on mirror 32B is reflected towards lens 36. A portion of the collimated radiation incident on mirror 32C is transmitted therethrough towards lens 36 and the other portion is directed towards mirror 32D. Mirror 32D directs a portion of incident radiation towards lens 36 and transmits the other portion towards mirror 32E which reflects the radiation towards lens 36.

Therefore, lens 36 receives five radiation beams at different angles. Alignment measurements are accomplished using the five radiation beams. Behind lens 36, a detector 37 is provided. In one embodiment, when operating in the infrared (IR) range of wavelengths, detector 39 is provided within Dewar 39 for cooling detector 37. The five radiation beams incident upon lens 36 are detected by detector 37 and displayed as beam spots A, B, C, D and E. Alignment measurements are performed in a similar fashion described in the above paragraphs.

Figure 5:
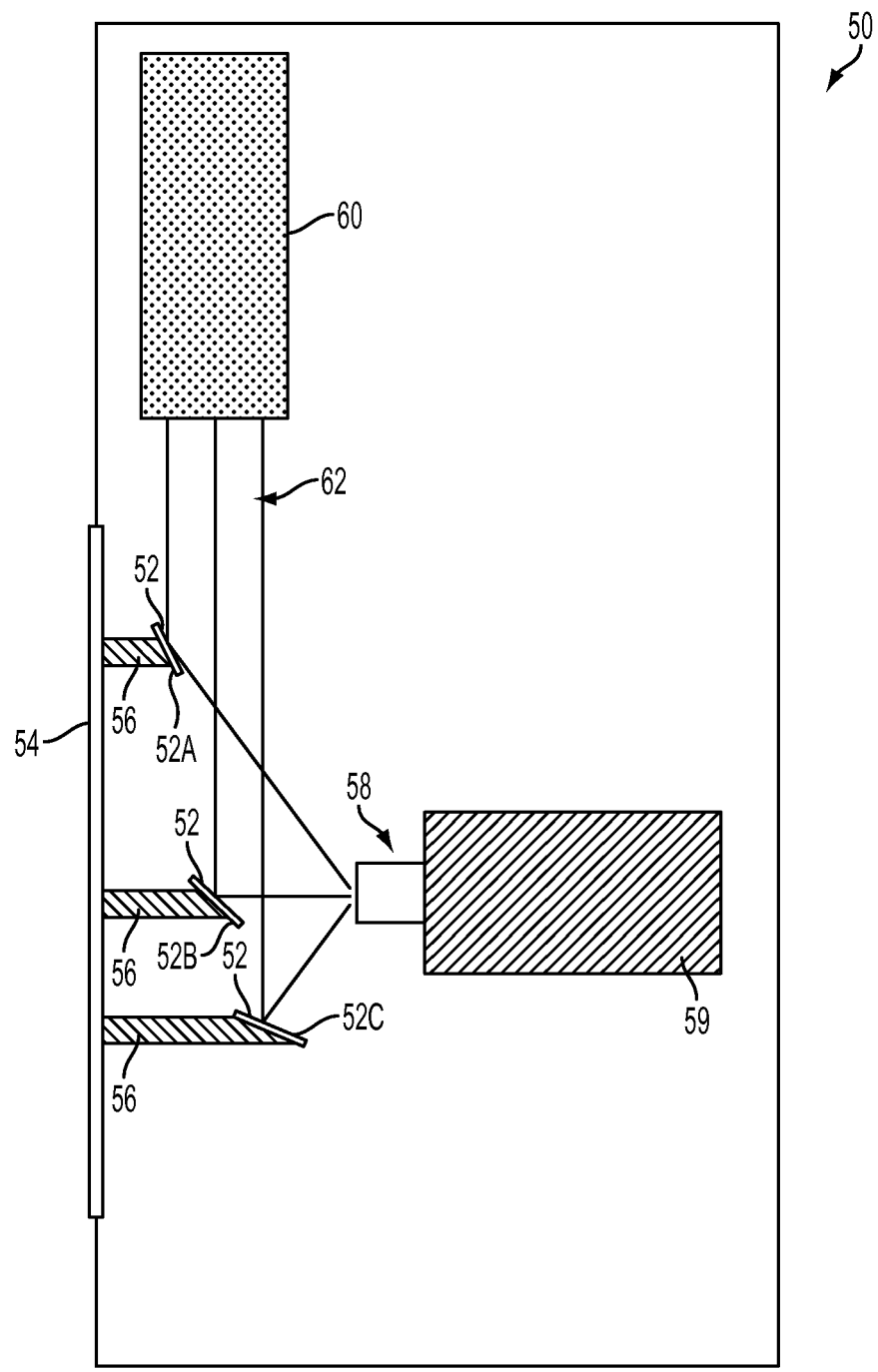
FIG. 5 is a schematic top view of an alignment apparatus for performing optical alignment of a lens, according to yet another embodiment.

FIG. 5 is a schematic top view of an alignment apparatus for performing optical alignment of a lens, according to yet another embodiment. Optical alignment apparatus 50 comprises plurality of mirrors 52. Mirrors 52 are mounted on frame, base or stand 54. In this embodiment, mirrors or reflectors 52 may not be precision machined. In this embodiment, there are shown three mirrors 52A, 52B and 52C. However, as it can be appreciated two or more mirrors can be used as desired to perform alignment measurements. Mirrors 52 can be mounted to frame 54 via support posts 56. Fine positioning of mirrors 52 can be done with shims, with epoxy that sets into final shape, or a combination of these or other such techniques that permit adjustment during measurement station assembly. Frame 54 is placed in front of lens 58. In one embodiment, frame 54 is positioned on a support table or the like (not shown). In another embodiment, frame 54 may be extended to the outline of optical alignment apparatus 50, in order to support lens 58 and sensor 59 in alignment with optical alignment apparatus 50.

In one embodiment, an optical assembly 60 is used to generate a collimated radiation beam 62. Mirrors 52A, 52B and 52C are selected and positioned on frame 54 such that the collimated radiation impinges upon mirrors 52A, 52B and 52C. In this embodiment, mirrors 52A, 52B and 52C are substantially totally reflective. The radiation beam received by mirrors 52A, 52B and 52C are directed towards lens 58. Therefore, lens 58 receives three radiation beams at different angles. Alignment measurements are accomplished using the three radiation beams. Mirrors 52A, 52B and 52C are offset relative to radiation beam 62 and can cover a relatively large area on lens 58.

Behind lens 58, a detector 59 is provided. In one embodiment, when operating in the infrared (IR) range of wavelengths, detector 59 is provided within a Dewar for cooling detector 59. The three radiation beams incident upon lens 58 are detected by detector 59 and displayed as beam spots A, B and C. Alignment measurements are performed in a similar fashion described in the above paragraphs.

As it can be appreciated from the above paragraphs, a method for performing optical alignment of a lens (e.g., lens 16) is provided. The method includes directing a collimated beam of radiation (e.g., radiation beam 15) onto the lens (e.g., lens 16), the lens (e.g., lens 16) having mounted thereon a mirror structure (e.g., mirror block 12) having a plurality of mirrors (e.g., mirror facets 14A, 14B, 14C and 14D). The mirrors (e.g., mirror 14A, 14B, 14C and 14D) are arranged so as to redirect the collimated beam of radiation (e.g., radiation beam 15) into the lens (e.g., lens) at different angles. The method further includes measuring an alignment parameter of the lens. The alignment parameter can be any one of boresight, focus, or rotation, or any combination of two or more of these parameters.

In one embodiment, the method further includes simultaneously generating a plurality of beam points (e.g., points A, B, C, D and E) on a detector (e.g., detector 18) provided behind the lens (e.g., lens 16), the plurality of points corresponding to the different angles.

It should be appreciated that in one embodiment, the drawings herein are drawn to scale (e.g., in correct proportion). However, it should also be appreciated that other proportions of parts may be employed in other embodiments.

Although the inventive concept has been described in detail for the purpose of illustration based on various embodiments, it is to be understood that such detail is solely for that purpose and that the inventive concept is not limited to the disclosed embodiments, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

Furthermore, since numerous modifications and changes will readily occur to those with skill in the art, it is not desired to limit the inventive concept to the exact construction and operation described herein. Accordingly, all suitable modifications and equivalents should be considered as falling within the spirit and scope of the present disclosure.

What is claimed:

1. A method for performing optical alignment of a lens, comprising:
   directing a collimated beam of radiation onto the lens, the lens having mounted thereon a mirror structure having a plurality of mirrors;
   redirecting, with the plurality of mirrors, the collimated beam of radiation into the lens at a plurality of field angles simultaneously to fully cover an entrance pupil of the lens; and
   measuring an alignment parameter of the lens without physical rotation of the lens detecting with a detector.

2. The method of claim 1, wherein the mirror structure has a shape of a frame on which four minors are provided.

3. The method of claim 1, wherein the plurality of mirrors are inclined at an angle relative to an on-axis ray of the collimated beam of radiation.

4. The method of claim 3, wherein the angle relative to an on-axis ray of the collimated beam of radiation is approximately 24°.

5. The method of claim 3, wherein the angle is a first angle for a lens having a first field-of-view and the angle is a second angle for a lens having a second field-of-view,
   wherein the first field-of-view is wider than the second field-of-view and the first angle is larger than the second angle.

6. The method of claim 1, wherein the mirror structure comprises a monolithic metal block and the plurality of minors are machined from the monolithic metal block so as to enhance a precision of alignment measurement.

7. The method of claim 1, wherein the plurality of mirrors are mounted on the mirror structure.

8. The method of claim 7, wherein the plurality of mirrors are fastened, attached or glued to the mirror structure.

9. The method of claim 1, wherein the mirror structure comprises a front face on which the plurality of mirrors are provided and a back face configured to mount the lens.

10. The method of claim 9, wherein the back face is adapted to mount a holder, the holder being configured to hold the lens and the detector.

11. The method of claim 1, wherein the plurality of mirrors are arranged to generate a plurality of off-axis calibration points on the detector positioned behind the lens.

12. The method of claim 11, wherein the plurality of off-axis calibration points are generated substantially simultaneously.

13. The method of claim 1, wherein the plurality of mirrors are arranged so as to reflect off-axis radiation of the collimated radiation beam into the lens at selected azimuth and elevation angles.

14. The method of claim 1, wherein the alignment para mete comprises boresight, focus, or rotation, or any combination of two or more thereof.

15. The method of claim 1, wherein the mirror structure comprises a monolithic mirror block so as to enhance a precision of alignment measurement.

16. The method of claim 1, wherein the mirror structure comprises a L-shaped structure on which are mounted the plurality of mirrors.

17. The method of claim 1, wherein a first mirror in the plurality of mirrors is semi-transparent and a second mirror in the plurality of mirrors is totally reflective.

18. The method according to claim 1, further comprising substantially simultaneously generating a plurality of beam points on the detector provided behind the lens, the plurality of points corresponding to the different angles.

19. The method according to claim 1, wherein measuring the alignment parameter comprises measuring boresight, focus, or rotation, or any combination of two or more thereof.

* * * * *